United States Patent
Pacala et al.

(10) Patent No.: US 6,650,558 B1
(45) Date of Patent: Nov. 18, 2003

(54) ASYMMETRICAL DRIVE CIRCUIT FOR FULL-WAVE BRIDGE

(75) Inventors: Viorel Mark Pacala, Mount Laurel, NJ (US); John Tsinetakes, Hamilton, NJ (US); Uditha Jayakody, Mt. Laurel, NJ (US); Sunder Shahani, Jackson, NJ (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 10/139,497

(22) Filed: May 6, 2002

(51) Int. Cl.[7] ................. H02M 7/5387; H02M 7/44
(52) U.S. Cl. ................................ 363/132; 363/98
(58) Field of Search .................... 363/132, 127, 363/131, 95, 98, 97, 37, 41

(56) References Cited

U.S. PATENT DOCUMENTS

| | | | |
|---|---|---|---|
| 3,737,755 A | * 6/1973 | Calkin et al. | 363/17 |
| 4,626,980 A | * 12/1986 | McGuire | 363/56 |
| 4,688,165 A | 8/1987 | Pruitt | 363/132 |
| 4,691,270 A | 9/1987 | Pruitt | 363/56 |
| 4,761,722 A | 8/1988 | Pruitt | 363/17 |
| 4,811,184 A | 3/1989 | Koninsky et al. | 363/17 |
| 4,843,202 A | * 6/1989 | Smith et al. | 363/132 |
| 5,451,962 A | 9/1995 | Steigerwald | 342/175 |
| 5,684,683 A | 11/1997 | Divan et al. | 33/65 |

* cited by examiner

Primary Examiner—Rajnikant B. Patel
(74) Attorney, Agent, or Firm—Duane Morris LLP (57) ABSTRACT

A full-wave bridge switching power supply includes first and third "serially" connected switches and second and fourth serially connected switches. An output transformer has one end of its primary winding connected to the juncture of the first and third switches and the other end connected to the juncture of the second and fourth switches. The switches are provided with zero-voltage switching signals by way of transformers. In order to avoid the switch-slowing effects of transformer inductance, a subsidiary power supply is associated with each switch. The subsidiary power supplies of the first and third switches are coupled to the control electrodes (gates) of the first and third switches at turn-on, and the subsidiary power supplies of the second and fourth switches are applied during turn-off.

6 Claims, 3 Drawing Sheets

ASYMMETRICAL DRIVE CIRCUIT FOR FULL-WAVE BRIDGE

FIELD OF THE INVENTION

This invention relates to switched power supplies, and more particularly to full-wave bridge power supplies.

BACKGROUND OF THE INVENTION

Switching power supplies are becoming more popular for various uses, as their sizes decrease and their power-handling capabilities increase. In general, such power supplies are used to convert one direct voltage to another direct voltage, as for example might be the case when using a mains-powered rectified supply at, say, 200 volts, to a thousand or more volts, as might be required by a transmitter arrangement. Switching power supplies can also be used for reducing voltage, as for example by reducing a mains-powered rectified supply at, say, 200 volts, to 5 or 10 volts, as might be required by a computer board. Instead of a mains-powered supply, the source of the direct voltage might be a vehicular battery. The advent of all-electric and hybrid-electric vehicles gives this aspect of switched power supplies the prospect of extensive use.

The need for smaller power converters and lower weight, or, equivalently, higher power-handling capability without an increase in size, tends to drive the design of DC-to-DC converters toward operation at higher frequencies, at which the magnetic components tend to be smaller than at lower frequencies. Unfortunately, this drive toward higher frequencies tends to exacerbate losses which occur in the semiconductor switches of the converter or power supply.

Figure 1:
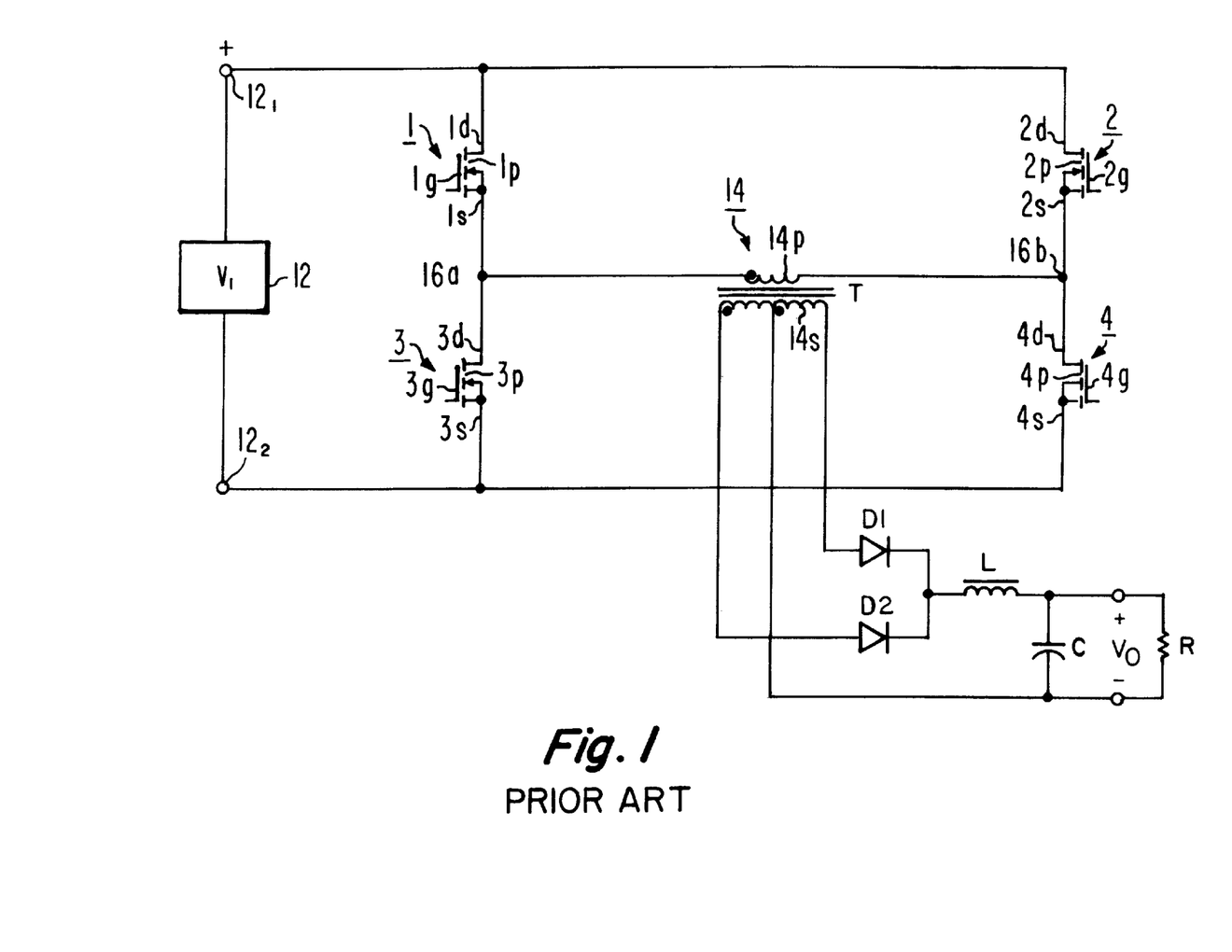
FIG. 1 is a simplified schematic diagram illustrating a prior-art full-wave bridge power-supply arrangement including four controllable switches, an output transformer, a rectifier arrangement, and an inductor.

FIG. 1 illustrates one type of prior-art switched power supply or DC-to-DC (DC/DC) converter. In FIG. 1, a source of direct voltage is designated 12. Source 12 connects to a first, second, third, and fourth controllable semiconductor switches 1, 2, 3, and 4, respectively. In this embodiment, the semiconductor switches are illustrated by a field-effect transistor (FET) symbol, but the switches can be of any type. In FIG. 1, controllable semiconductor switch 1 includes a main current-conducting path 1$p$, extending from a source 1$s$ to a drain 1$d$. The current flow in the main current-conducting path 1$p$ is controlled by the voltage or charge applied to the control electrode, illustrated as a gate 1$g$, all as is well known to those skilled in the art. Another controllable semiconductor switch is illustrated as 2, and it includes a main current conducting path 2$p$ extending between a source 2$s$ and a drain 2$d$, all under the control of the charge or voltage applied to a control electrode, illustrated as a gate 2$g$. Additional controllable semiconductor switches are illustrated as 3 and 4. Switch 3 includes a controllable path 3$p$ extending between source 3$s$ and drain 3$d$, under the control of a control electrode 3$g$, and switch 4 includes a controllable path 4$p$ extending between source 4$s$ and drain 4$d$, controlled by a control electrode 4$g$.

In the arrangement of FIG. 1, the source 1$s$ of switch 1 is connected to the drain 3$d$ of switch 3 at a first node or tap 16$a$, and that electrode of switch 1 which is remote from the tap 16$a$, namely drain electrode 1$d$, is connected to a first terminal 12$_1$ of direct voltage source 12. Also, that electrode of the main current conducting path 3$p$ of switch 3 is connected to the other terminal of the direct voltage power source 12. More particularly, source 3$s$ of switch 3 is connected to terminal 12$_2$ of source 12. The arrangement of switches 2 and 4 is not dissimilar to that of switches 1 and 2. More particularly, the source 2$s$ of switch 2 is connected to the drain 4$d$ of switch 4 at a tap 16$b$. Those main current conducting path electrodes of switches 2 and 4 which are remote from tap 16$b$ are connected to the direct voltage power supply. Thus, drain electrode 2$d$ of switch 2 is connected to terminal 12$_1$ of supply 12, and the source electrode 4$s$ of switch 4 is connected to terminal 12$_2$ of supply 12. As known to those skilled in the art, there are several ways to control the switching of the various switches of the power supply of FIG. 1, so that an alternating voltage appears across taps 16$a$ and 16$b$, where the word "across" means that a voltage difference appears "between" the terminals, however the terminals may be physically arranged.

The alternating voltage appearing across the taps 16$a$ and 16$b$ of the power supply of FIG. 1 is coupled to the primary winding 14$p$ of a transformer arrangement 14. Transformer arrangement 14 also includes at least one secondary winding, illustrated as a center-tapped secondary winding 14$s$. Winding 14$s$ is connected to a rectifier and filter arrangement including diodes or rectifiers designated D1 and D2, and a filter including a series inductor L and a shunt capacitor C. The output direct voltage of the arrangement of FIG. 1 is a voltage designated $V_o$, produced "across" (again, not a term relating to physical location) capacitor C for application to a load, represented by a resistor R.

Those skilled in the art know that there are several ways to control the controllable switches 1, 2, 3, and 4 of FIG. 1 in order to generate the desired alternating voltage across the primary winding 14$p$ of FIG. 1. These various techniques have various advantages and disadvantages, and some may be more desirable at various states of the technology than others. Some of these techniques are described in U.S. Pat. No. 4,811,184, issued Mar. 7, 1989 in the name of Koninsky et al.; 4,688,165, issue Aug. 18, 1987 in the name of Pruitt; 4,691,270, issued Sep. 1, 1987 in the name of Pruitt; 4,761,722, issued Aug. 2, 1988 in the name of Pruitt; 5,451,962, issued Sep. 19, 1995 in the name of Steigerwald; 5,684,683, issued Nov. 4, 1997 in the name of Divan et al. An article entitled *Design Review: 100 W, 400 kHz, DC/DC Converter With Current Doubler Synchronous Rectification Achieves 92% Efficiency*, by Laszlo Balogh, gives an overview of various types of switch control. One of the types of switch control which is currently advantageous is the phase-shift control, in which the control electrode drive signals are relatively phase shifted so that intervals of conduction of one switch pair of a bridge, such as switch pair 1,3, to apply power to the transformer, are separated by intervals in which another switch pair, such as switch pair 1,2, are conductive, and no power is applied to the transformer.

FIG. 2$a$ is a representation of the sequence of states of operation of the converter or power supply of FIG. 1 following a phase shift control pattern. FIGS. 2$b$, 2$c$, 2$d$, and 2$e$ (FIGS. 2$a$ through 2$e$ or FIGS. 2$a$–2$e$) are time plots of ON (main current conducting path conductive) and OFF (main current conducting paths nonconducting) times of controllable semiconductor switches 1, 2, 3, and 4, respectively, of FIG. 1. FIG. 2$f$ is a time plot 206 of the voltage applied to the primary winding 14$p$ of the transformer 14 of FIG. 1, FIG. 2$g$ is a time plot of the magnetizing current $I_M$ in the primary winding 14$p$ of transformer 14 of FIG. 1 in response to the applied voltage of FIG. 2$f$. FIG. 2$h$ is an amplitude-time plot illustrating the total current in the transformer 14 of FIG. 1, including magnetizing current and load current portions; during the first state in the interval t0–t1, the current is in a first direction, indicated as "upward" in FIG. 2$h$. FIG. 2$j$ is a plot of the current in filter inductor L of FIG. 1. The first state illustrated in FIG. 2a is state S1, which extends from time t0 to a later time t1. In state S1, switches 1 and 4 are ON or conducting, as indicated by the logic "high" or "1" level of the gate signals 201 and 204 of FIGS. 2b and 2e, respectively. As a consequence, current flows from terminal $12_1$ of supply 12 of FIG. 1, through the main current carrying path 1p of switch 1, through the primary winding 14p of transformer 14, and through the main current carrying path 4p of controllable semiconductor switch 4 to the other terminal, namely terminal $12_2$, of direct voltage source 12. During the state-1 interval extending from t0 to t1, controllable semiconductor switches 2 and 3 are nonconductive, as suggested by the logic "low" or "0" level of their control electrode signals 202 and 203 of FIGS. 2c and 2d, respectively. During the first-state interval t0 to t1, the magnetizing current in the transformer 14 increases steadily or monotonically, as suggested by $I_M$ plot 208 of FIG. 2g. Also during the first-state interval t0 to t1, the total current $I_T$ in the transformer 14 increases, following the magnetizing current, but also including a portion responsive to the load current. Further during state-1 interval t0 to t1 of FIGS. 2i and 2j, transformer 14 of FIG. 1 produces an output voltage, illustrated by plot 212 of FIG. 2i, for rectification by one of diodes D1 and D2 of FIG. 1, which in turn results in the increasing current 214 of FIG. 2j in inductor L of FIG. 1.

Figure 2A:
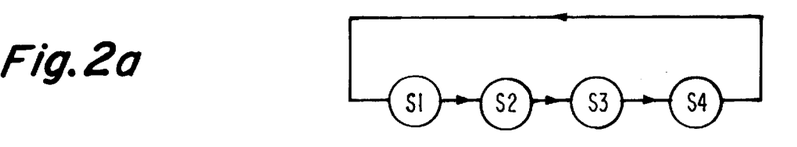
FIG. 2a illustrates the progression of switching states in the "zero-voltage" switching,mode of the arrangement of FIG. 1, FIGS. 2b, 2c, 2d, and 2f illustrate gate drive signals which may be applied to the controllable switches of FIG. 1 to assume the various states of FIG. 2a, FIG. 2f illustrates the voltage applied across the output transformer of the structure of FIG. 1 in response to the states of FIG. 2a, FIG. 2g illustrates the magnetizing component of the current in the transformer.

During the second state S2 of FIG. 2a, extending from time t1 to time t2, controllable switches 1 and 2 of FIG. 1 are ON or conductive, while switches 3 and 4 are OFF or nonconductive. The ON states are indicated by the high states of plots 201 and 202 of FIGS. 2b and 2d, respectively. The OFF states are indicated by the low states of plots 203 and 204 of FIGS. 2c and 2e, respectively. With switches 3 and 4 OFF, no current can flow from direct voltage source 12, and no power can be transferred to the load. Consequently, the only source of energy to maintain conduction in any of the switches of FIG. 1 is the magnetizing or inductive current flowing in transformer 14. This magnetizing current continues to flow in the loop including conductive controllable semiconductor switches 1 and 2. Since switches 1 and 2 are conductive, their ON-state resistance is low, and little voltage is occasioned by the flow of the magnetizing current in the loop. Consequently, the magnetizing current flow continues with little power loss, so the does not decrease markedly in the interval t1–t2, as illustrated by plot 208 of FIG. 2g. The current through inductor L of FIG. 1, however, must provide power to the load, so its current decreases in the second-state interval t1–t2, as illustrated by plot 210 of FIG. 2h.

State S2 of FIG. 2a changes to state S3 at time t2, with controllable semiconductor switch 1 turning OFF and switch 3 turning ON, while switch 2 remains ON and switch 4 remains OFF. In this state, the full direct voltage from source 12 is applied across the main current carrying path 1p of switch 1, and current begins to flow through the primary winding 14p in the "opposite" or second direction relative to the direction of flow immediately before time t2, as indicated by plot 210 of FIG. 2h. During state 3, in the interval T2–t3, the magnetizing current of transformer 14 decreases to zero, and then again increases in the opposite polarity, as indicated by plot 208 of FIG. 2g, and the total current continues to increase, as can be seen from plot 210 of FIG. 2g. State S3 changes to state S4 at time t3, with the turning OFF of switch 2 and turning ON of switch 4, as suggested by their gate voltages 202 and 204 of FIGS. 2c and 2e, respectively. In state S4, switches 1 and 2 are OFF or nonconductive, and switches 3 and 4 are ON or conductive, to form a loop through which substantially constant magnetizing current can flow in the interval t3–t4, as indicated by plot 208 of FIG. 2g. Finally, the state of the system reverts to the first state S1 at time t4, corresponding to a new time t0, with the opening of switch 3 and closing of switch 1.

Improved switching power supplies are desired.

SUMMARY OF THE INVENTION

A full-wave bridge switching power supply according to a general aspect of the invention includes first and third "serially" connected switches, and second and fourth "serially" connected switches. An output transformer has one end of its primary winding connected to the juncture of the first and third switches and the other end connected to the juncture of the second and fourth switches. The switches are provided, by way of transformers, with zero-voltage switching signals. In order to avoid the switch-slowing effects of transformer inductance, a subsidiary power supply is associated with each switch. The subsidiary power supplies of the first and third switches are coupled to the control electrodes (gates) of the first and third switches at turn-on, and the subsidiary power supplies of the second and fourth switches are applied during turn-off.

A full-wave switching power supply according to somewhat more specific hypostasis of the invention includes first, second, third, and fourth controllable switches, each of which includes a control electrode and a controlled current conducting main path. A bridge type of connection is provided by means connecting a first end of the main path of the first controllable switch to a second end of the main path of the third controllable switch to thereby define a first tap point, and further means connecting a first end of the main path of the second controllable switch to a second end of the main path of the fourth controllable switch, to thereby define a second tap point. An output transformer includes a primary winding coupled to the first and second tap points, for being driven, during operation, with alternating voltage appearing thereacross. A zero-voltage switching signal generator drives the controllable switches in zero-voltage fashion. A drive transformer arrangement is coupled to the zero-voltage switching signal generating means and to the control electrodes of the first, second, third, and fourth controllable switches. First, second, third and fourth subsidiary power supplies are coupled to secondary windings of the drive transformer arrangement, for generating subsidiary direct voltages in response to the switching signals. First, second, third, and fourth control electrode switches are coupled to the first, second, third, and fourth subsidiary power supplies, respectively, and to the control electrodes of the first, second, third, and fourth controllable switches, respectively, for coupling the first and third subsidiary direct voltages to the control electrodes of the first and third controllable switches, respectively, during their respective turn-on intervals, and for coupling the second and fourth subsidiary direct voltages to the control electrodes of the second and fourth controllable switches, respectively, during their respective turn-off intervals.

A full-wave switching power supply according to an aspect of the invention includes a source of direct voltage. The source of direct voltage defines first and second terminals. The power supply also includes a first controllable semiconductor switch including a main current conducting path and a control electrode, and a third controllable semiconductor switch including a main current conducting path and a control electrode. The current conducting paths of the first and third controllable semiconductor switches are coupled together to define a first tap point. That end of the main current conducting path of the first switch which is remote from the first tap point is coupled to the first terminal of the source of direct voltage, and that end of the current conducting path of the third controllable switch which is remote from the first tap point is coupled to the second terminal of the source of direct voltage. The power supply also includes a second controllable semiconductor switch including a main current conducting path and a control electrode, and a fourth controllable semiconductor switch including a main current conducting path and a control electrode. The current conducting paths of the second and fourth switches are coupled together to define a second tap point. That end of the main current conducting path of the second switch which is remote from the second tap point is coupled to the first terminal of the source of direct voltage, and that end of the current conducting path of the fourth switch which is remote from the second tap point is coupled to the second terminal of the source of direct voltage. The power supply also includes switching control means for generating switching signals for control of the control electrodes of the first, second, third and fourth controllable semiconductor switches in such a manner that (a) in a first state following a fourth state, the first and fourth switches are conductive, and the second and third switches are nonconductive, (b) in a second state immediately following the first state, the first and second switches are conductive, and the third and fourth switches are nonconductive, (c) in a third state immediately following the second state, the second and third switches are conductive, and the first and fourth switches are nonconductive, and (d) during the fourth state, immediately preceding the first state, the third and fourth switches are conductive, and the first and second switches are nonconductive. A first transformer arrangement includes a primary winding coupled to the switching control means, and also includes first and second secondary windings across which a first set of the switching signals are generated. A second transformer arrangement includes a primary winding coupled to the switching control means, and also includes first and second secondary windings across which a second set of the switching signals are generated. A first subsidiary power supply is coupled to the first secondary winding of the first transformer arrangement, for producing a first subsidiary direct voltage in response to the switching signals. A third subsidiary power supply is coupled to the second secondary winding of the first transformer arrangement, for producing a third subsidiary direct voltage in response to the switching signals. A second subsidiary power supply is coupled to the first secondary winding of the second transformer arrangement, for producing a second subsidiary direct voltage in response to the switching signals. A fourth subsidiary power supply is coupled to the second secondary winding of the second transformer arrangement, for producing a fourth subsidiary direct voltage in response to the switching signals. A first drive switching means is coupled to the first and second subsidiary power supplies, and to the first and second secondary windings of the first transformer arrangement, and to the control electrodes of the first and third controllable semiconductor switches, for coupling the first and third subsidiary direct voltages to the control electrodes of the first and third controllable semiconductor switches, respectively, during their respective turn-ON intervals, for charging the control electrodes of the first and third controllable semiconductor switches, respectively. A second controllable drive switching means includes control electrodes coupled to the second and third subsidiary power supplies and to the first and second secondary windings of the second transformer arrangement, and also includes switched conduction paths coupled to the control electrodes of the second and fourth controllable semiconductor switches and to the second tap point, for, in response to switching signals, coupling the second and fourth subsidiary direct voltages to the control electrodes of the second controllable drive switching means, for thereby discharging the control electrodes of the second and fourth controllable semiconductor switches. First control electrode discharge means is coupled to the control electrodes of the first and third controllable semiconductor switches, and also coupled to the first and second secondary windings of the first transformer arrangement, for discharging the control electrodes of the first and third controllable semiconductor switches during their respective turn-off periods, without applying to the control electrodes the subsidiary direct voltages from the first and third subsidiary power supplies. Second control electrode charging means is coupled to the control electrodes of the second and fourth controllable semiconductor switches, and also coupled to the first and second secondary windings of the second transformer arrangement, for charging the control electrodes of the second and fourth controllable semiconductor switches during their respective turn-ON intervals, without applying to the control electrodes the subsidiary direct voltages from the second and fourth subsidiary power supplies.

A switching power supply according to another aspect of the invention is for producing alternating voltage from a source of direct voltage, where the source of direct voltage includes first and second power terminals. The power supply comprises a power transformer which includes a primary winding defining first and second ends, and also defining a secondary winding at which the alternating voltage is produced. The switching power supply also includes first, second, third, and fourth power switches, each includes a main current conducting path and a control electrode. The first and third power switches have their main current conducting paths coupled together to define a first tap point. The first tap point is coupled to the first terminal of the primary winding of the power transformer. The second and fourth power switches have their main current conducting paths coupled together to define a second tap point. The second tap point is coupled to the second terminal of the primary winding of the power transformer. That end of the main current conducting path of the first power switch which is remote from the first tap point is coupled to the first power terminal of the source of direct voltage. That end of the main current conducting path of the third power switch which is remote from the first tap point is coupled to the second power terminal of the source of direct voltage. That end of the main current conducting path of the second power switch which is remote from the second tap point is coupled to the first power terminal of the source of direct voltage. That end of the main current conducting path of the fourth power switch which is remote from the second tap point is coupled to the second power terminal of the source of direct voltage. Taken together, these connections define a full-wave bridge structure. The switching power supply according to this other aspect of the invention also includes a source of zero-voltage switching signals for controlling a full-wave bridge for zero-voltage switching. A first transformer arrangement includes a primary winding coupled to the source of switching signals, and also includes first and second secondary windings, for coupling switching signals to the control electrodes of the first and third power switches. A first subsidiary power supply is coupled to the first secondary winding of the first transformer arrangement, for producing a first subsidiary direct voltage, relative to the first tap, in response to the switching signals. A third subsidiary power supply is coupled to the second secondary winding of the first transformer arrangement, for producing a third subsidiary direct voltage, relative to the second terminal of the source of direct voltage, also in response to the switching signals. A first control electrode or gate turn-on control switch arrangement is coupled to the first subsidiary power supply and to the control electrode of the first power switch, for applying the first subsidiary direct voltage to the control electrode of the first power switch in response to a turn-on portion of the zero-voltage switching signals applied to the first transformer arrangement. A first control electrode turn-off control switch arrangement is coupled to the control electrode of the first power switch and to the first tap point, for discharging the control electrode of the first power switch in response to a turn-off portion of the switching signals applied to the first transformer arrangement. A third control electrode turn-on control switch arrangement is coupled to the third subsidiary power supply and to the control electrode of the third power switch, for applying the third subsidiary direct voltage to the control electrode of the third power switch in response to a turn-on portion of the switching signals applied to the first transformer arrangement. A third control electrode or gate turn-off control switch arrangement is coupled to the control electrode of the third power switch and to the second terminal of the source of direct voltage, for discharging the control electrode of the third power switch in response to a turn-off portion of the switching signals applied to the first transformer arrangement.

The switching power supply according to this other aspect of the invention also comprises a second transformer arrangement including a primary winding coupled to the source of switching signals, and also includes first and second secondary windings, for receiving switching signals for coupling to the control electrodes of the second and fourth power switches. A second subsidiary power supply is coupled to the first secondary winding of the second transformer arrangement, for producing, in response to the switching signals, a second subsidiary direct voltage, relative to the second tap. A fourth subsidiary power supply is coupled to the second secondary winding of the second transformer arrangement, for producing a fourth subsidiary direct voltage, relative to the second terminal of the source of direct voltage, also in response to the switching signals. A second control electrode or gate turn-on control switch arrangement is coupled to the first terminal of the first secondary winding of the second transformer arrangement, for supplying charge to the second control electrode of the second switching arrangement during a turn-on portion of the switching signals. A second control electrode turn-off control switch arrangement is coupled to the second subsidiary power supply and to the control electrode of the second power switch, for applying the second subsidiary direct voltage to the control electrode of the second power switch in response to a turn-off portion of the switching signals applied to the second transformer arrangement. A fourth control electrode gate or gate turn-on control switch arrangement is coupled to the first terminal of the second secondary winding of the second transformer arrangement, for supplying charge to the control electrode of the fourth switching arrangement during a turn-on portion of the switching signals applied to the second transformer arrangement. A fourth control electrode turn-off control switch arrangement is coupled to the fourth subsidiary power supply and to the control electrode of the fourth power switch, for applying the fourth subsidiary direct voltage to the control electrode of the fourth power switch in response to a turn-off portion of the switching signals applied to the second transformer arrangement.

In a particular embodiment of this other aspect of the invention, the switching power supply further includes a second end of the first secondary winding of the first transformer arrangement electrically connected to the first tap point, and the first subsidiary power supply includes a first rectifier and a first capacitor coupled to the first secondary winding of the first transformer arrangement, for producing the first subsidiary direct voltage across the first capacitor in response to the switching signals. The third subsidiary power supply of this particular embodiment also further includes a third rectifier and a third capacitor coupled to the second secondary winding of the first transformer arrangement, for producing a third subsidiary direct voltage across the third capacitor in response to the switching signals. The first control electrode turn-on control switch arrangement is coupled to a terminal of the first capacitor and to the control electrode of the first power switch, and the third control electrode turn-on control switch arrangement is coupled to a terminal of the third capacitor, and to the control electrode of the third power switch.

In a particular avatar of the particular embodiment, the first capacitor includes one electrode connected to the second terminal of the first secondary winding of the first transformer arrangement and to the first tap point, and a second electrode connected to a terminal of the first rectifier, the second capacitor includes one electrode coupled to the second terminal of the first secondary winding of the second transformer arrangement, the third capacitor includes one electrode coupled to a second terminal of the second secondary winding of the first transformer arrangement, and the fourth capacitor includes one electrode coupled to the second terminal of the second secondary terminal of the second transformer arrangement.

In a particular hypostasis of this avatar of the power supply, the first control electrode turn-on control switch arrangement includes a control electrode, which control electrode is coupled to the first terminal of the first secondary winding of the first transformer arrangement, the third control electrode turn-on control switch arrangement includes a control electrode, which control electrode is coupled to the second terminal of the source of direct voltage, the second control electrode turn-off control switch arrangement includes a control electrode, which control electrode is coupled to the first terminal of the first secondary winding of the second transformer arrangement, and the fourth control electrode turn-off control switch arrangement includes a control electrode, which control electrode is coupled to the first terminal of the second secondary winding of the second transformer arrangement.

BRIEF DESCRIPTION OF THE DRAWING

FIG. 2h illustrates the total current in the transformer under rectified and filtered load; FIG. 2i illustrates the load current in the arrangement of FIG. 1, FIG. 2j illustrates the output inductor current in the arrangement of FIG. 1, FIGS. 2k, 2l, 2m, and 2n illustrate the voltages applied across the various controllable switches of the arrangement of FIG. 1 during operation.

DESCRIPTION OF THE INVENTION

It is well known that "soft" switching operation is much to be preferred to "hard" switching. The term "hard" switching refers to the switching OFF or into nonconduction (or alternatively ON or into conduction) of a controllable semiconductor switch by control of the control electrode, while the main current conducting path, capacitance is charged, which corresponds to when a voltage appears across the main current conducting path. In the context of a FET, hard switching occurs when the gate is driven to render the source-to-drain conducting path nonconductive while a substantial voltage appears "between" or "across" the drain and source, where the terms are used in their electrical context. "Soft" switching, on the other hand, refers to the rendering nonconductive or OFF the source-to-drain conductive path while the capacitance is discharged, corresponding to when the voltage thereacross is minimal or zero. The problem with hard switching is that the gating OFF (or ON) of the switch does not occur instantaneously, but requires a finite time period. The presence of a finite voltage across, together with a finite, albeit decreasing (or increasing), current through the main current conducting path inherently gives rise to heating power dissipation or generation. This heating power occurs with each switch cycle. When, as with switching power supplies, the switching frequency is desirably high, the heat is generated at the switching rate. Thus, higher switching frequencies necessarily involve greater heat production in the switch, all else being equal. One way to reduce the heat generation is to perform the switching operation during each cycle as quickly as possible, which avoids long durations of heat generation during each cycle.

The invention is predicated on the realization that the bridge circuit of FIG. 1, operating in the phase-shift mode described in conjunction with FIGS. 2a through 2j, is not symmetrical as to its control requirements. FIGS. 2k, 2l, 2m, and 2n illustrate as plots 221, 222, 223, and 224 the voltage appearing across the source-to-drain (main current conductive) paths of controllable semiconductor switches 1, 2, 3, and 4, respectively, of FIG. 1. Referring to plots 201 and 221 of FIGS. 2b and 2k, respectively, it can be seen that switch 1 has zero source-to-drain applied voltage just before time t2 at which it switches OFF or into nonconduction, but has a finite applied voltage just before time t4=t0 at which it switches ON or into conduction. Similarly, referring to plots 203 and 223 of FIGS. 2c and 2l, respectively, it can be seen that controllable semiconductor switch 3 has zero source-to-drain applied voltage just before time t4=t0 at which it switches OFF or into nonconduction, but has a finite applied voltage just before time t2 at which it switches ON or into conduction. Switch 2, on the other hand, referring to plots 202 and 222 of FIGS. 2d and 2m, respectively, can be seen to have zero source-to-drain applied voltage just before time t3 at which it switches ON or into conduction, but has a finite applied voltage just before time t1 at which it switches OFF or into nonconduction. Lastly, referring to plots 204 and 224 of FIGS. 2e and 2n, respectively, controllable semiconductor switch 4 can be seen to have zero source-to-drain applied voltage just before time t1 at which it switches OFF or into nonconduction, but has a finite applied voltage just before time t3 at which it switches ON or into conduction.

Figures 2B, 2C:
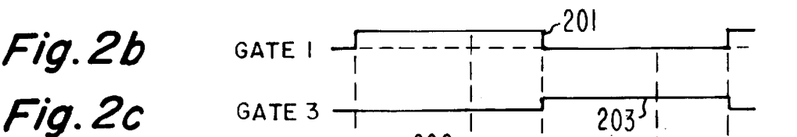
Figure 2D:
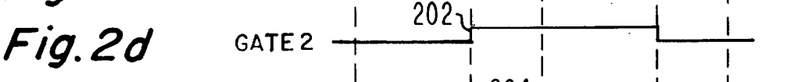
Figures 2E, 2F, 2G, 2H, 2I, 2J:
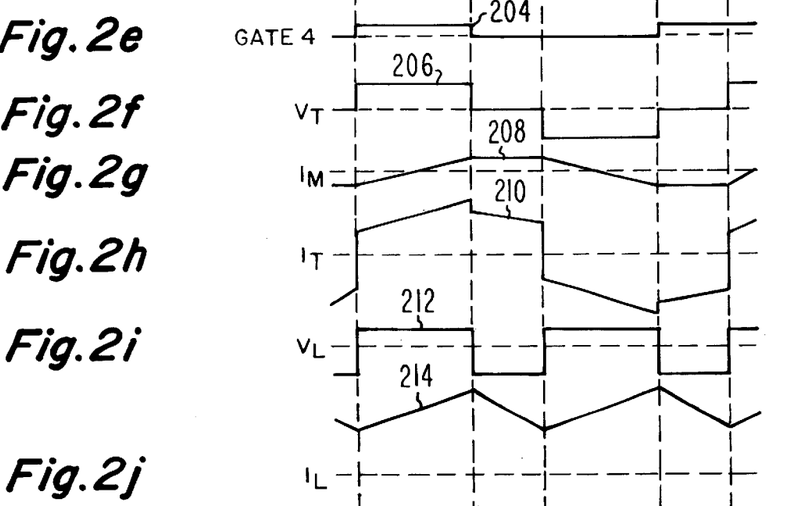
Figures 2K, 2L:
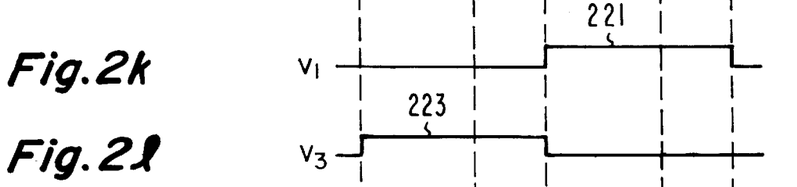
Figure 2M:
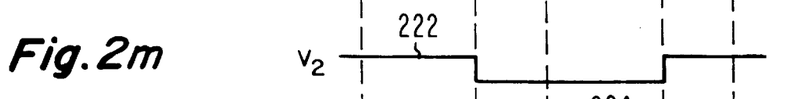
Figure 2N:
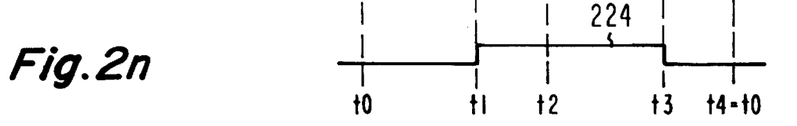

From the description of the state of the arrangement of FIG. 1 during phase-shift controlled switching, as described in conjunction with FIGS. 2a–2n, it appears that the times at which heating effects will be large for controllable semiconductor switch 1 will occur at recurrent times t4=t0, when switch 1 turns ON. The turn-OFF of switch 1 is not as important from the heating point of view, because it occurs at time t2, when there is no source-to-drain applied voltage. Similarly, the times at which heating effects will be large for controllable semiconductor switch 3 will occur at recurrent times t2, when switch 3 turns ON in the presence of an applied source-to-drain voltage. The turn-OFF of switch 3 at time t4=t0 is not as important from the heating point of view, because it occurs at a time when there is no prior source-to-drain applied voltage.

On the other hand, voltage is applied across the source-to-drain main current conductive path of controllable semiconductor switch 2 just before switch time t1 at which switch 2 turns ON, as suggested by plots 202 and 222 of FIGS. 2d and 2m, respectively, and no voltage is applied just before time t3, when switch 2 turns OFF. Similarly, voltage is applied across the source-to-drain main current conductive path of controllable semiconductor switch 4 just before switch time t3 at which switch 4 turns ON, as suggested by plots 204 and 224 of FIGS. 2e and 2n, respectively, and no voltage is applied just before time t1, when switch 4 turns OFF.

Comparison of the states of controllable semiconductor switches 1, 2, 3, and 4 of FIG. 1, as illustrated in FIGS. 2a–2n, shows that source-to-drain voltage is applied to switches 1 and 3 immediately prior to their being rendered conductive or ON, and no voltage is applied immediately prior to their being rendered nonconductive or OFF. Consequently, it is desirable to accelerate or speed up their turn-ON, and no need to accelerate their turn-OFF. By contrast, there is no voltage applied across the source-to-drain main current conducting paths of controllable semiconductor switches 2 and 4 immediately prior to their being switched ON or into conduction, but voltage is applied thereacross just prior to their being switched OFF. Consequently, it is desirable to accelerate or speed up their turn-OFF. A purpose of the invention is to accelerate or speed up the turn-ON time of switches 1 and 3 and the turn-OFF time of switches 2 and 4. This acceleration of the relevant switching times can be used to reduce cost by eliminating extra parts which accelerate switching at times which doesn't matter, or improve reliability by reducing heat generation in the power switches, or to increase the switching rate so that smaller transformers can be used. The invention may thus be translated or applied in various different contexts, any of which tends to optimize some aspect of the system in which the invention is used.

Figure 3:
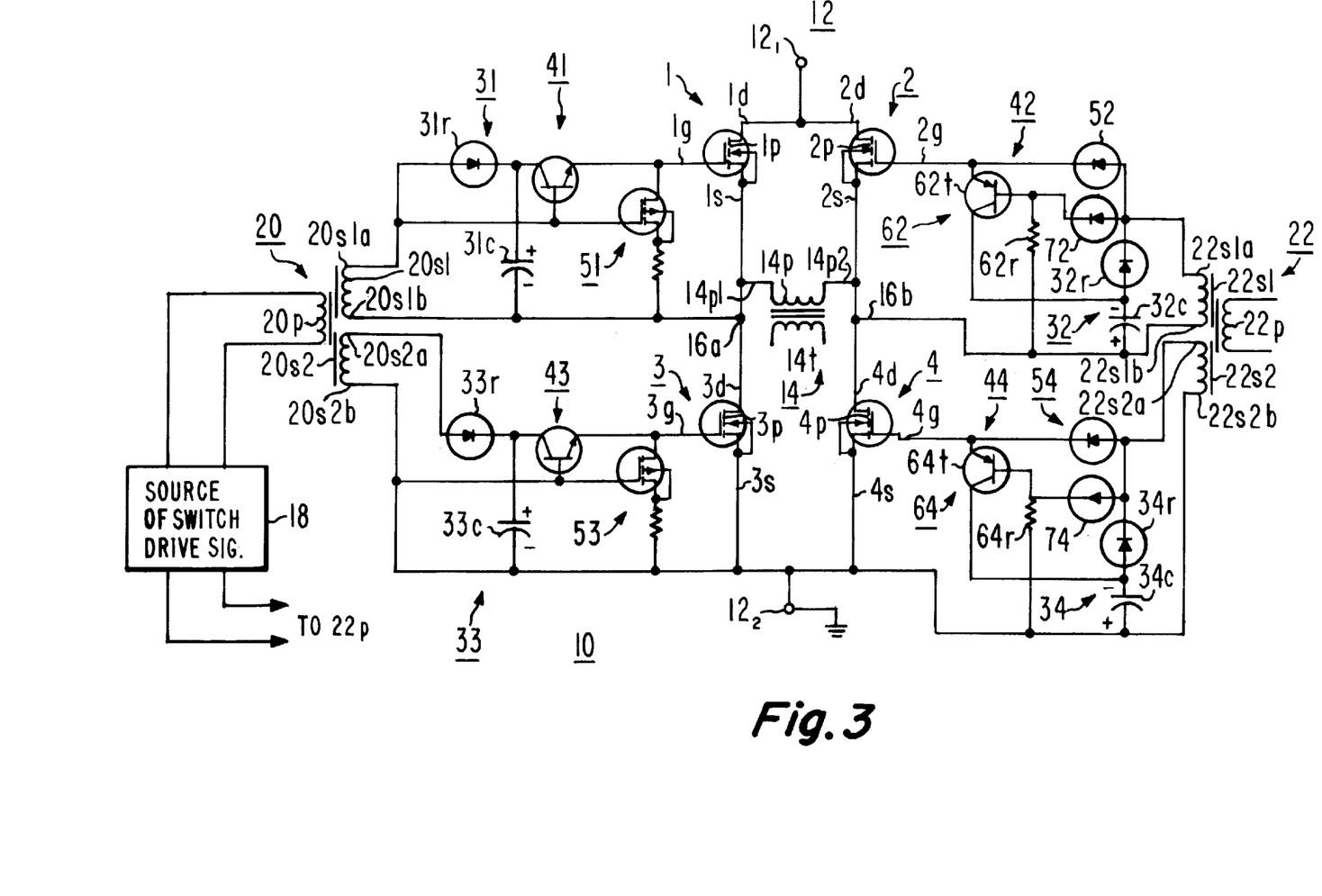
FIG. 3 is a simplified schematic diagram of a full-wave bridge switching power supply according to an aspect of the invention.

So far, there has been no description of any means for generating the desired switching signals or for coupling them to the various switches of the circuit of FIG. 1. FIG. 3 is a simplified schematic diagram of a switching power supply according to an aspect of the invention. In FIG. 3, elements corresponding to those of FIG. 1 are designated by like reference numerals. In addition to switches 1, 2, 3, and 4 and power supply 12, the arrangement of FIG. 3 includes control electrode or gate drive circuits for the control electrodes of controllable semiconductor switches 1, 2, 3, and 4. In FIG. 3, a source of phase-shift switching signals is designated as 18. The switching signals are applied from source 18 to the controllable semiconductor switches by means of transformers, in order "float" the switching signal to accommodate the varying voltages of the bridge circuit. Thus, one set of switching signals, corresponding to switching signals 201 and 203 of FIGS. 2b and 2c, is applied to the primary winding 20p of a transformer 20. Another set of switching signals, corresponding to switching signals 202 and 204 of FIGS. 2d and 2e, is applied to the primary winding 22p of a transformer 22. Transformer 20 includes first and second secondary windings 20s1 and 20s2, respectively. One end 20s1b of secondary winding 20s1 is connected to tap point 16a, and one end 20s2b of secondary winding 20s2 is connected to the second terminal $12_2$ of direct voltage source 12, which is designated by a ground symbol in FIG. 3. Transformer 22 similarly includes first and second secondary windings 22s1 and 22s2, respectively.

Those skilled in the art will recognize that transformers such as 20 and 22 have inherent inductance and some capacitance, which together have the effect of slowing the rise time of signals passing therethrough. In the case of switching signals for controllable semiconductor switches used in power applications, such as switches 1, 2, 3, and 4 of FIG. 3, the decrease of rise time attributable to the transformers is disadvantageous, in that it imposes a delay in the turn-OFF or turn-ON times, with the abovementioned attendant heat problems. This problem is alleviated by providing an auxiliary, ancillary, or subsidiary power supply on the secondary side of each secondary winding 20s1, 20s2, 22s1, and 22s2, together with an active gating switch which connects the subsidiary power supply to the control electrode of the controllable semiconductor switch which is to be switched. The interposition of the power supply and gating switch allows the relatively small amount of energy which initially passes through the transformer to enable the gating switch, to thereby couple the relatively large energy of the subsidiary power supply to the control electrode, to rapidly charge the control electrode, to switch the controllable semiconductor switch more rapidly than if the switching signal passing through the transformer were the sole source of charge.

In FIG. 3, a first subsidiary power supply is designated 31, and includes a capacitor 31c having one electrode coupled to tap 16a, or equivalently to end 20s1b of secondary winding 20s1 of transformer 20. The other electrode of capacitor 31c is connected by way of a rectifier 31r to the first or "hot" end 20s1a of secondary winding 20s1. With this configuration, and with a "rectangular" switching signal applied to the transformer, capacitor 31c will charge to a direct voltage substantially equal to the peak value of the rectangular signal. Rectifier 31r has its anode connected to the winding 20s1 and its cathode adjacent capacitor 31c, so the capacitor takes on a positive charge relative to tap point 16a, as suggested by the + symbol. The voltage appearing across capacitor 31c of subsidiary power supply 31 is controllably coupled across the gate-to-source junction of controllable semiconductor switch 1 by a driver switch 41, which is illustrated as a bipolar npn switch transistor having its collector connected to capacitor 31c, its base connected to the hot end of secondary winding 20s1, and its emitter connected to gate electrode 1g of switch 1. In addition, a discharge switch illustrated as a FET 51 has its, main current conducting source-to-drain path coupled from the control electrode 1g of switch 1 to tap point 16a, and its gate connected to the hot end 20s1a of secondary winding 20s1. During those intervals when the hot end 20s1a of secondary winding 20s1 goes positive relative to the reference tap 16a, the gate is charged by the full voltage across capacitor 31c. When the hot end 20s1a of secondary winding 20s1 goes negative relative to tap point 16a, on the other hand, FET 51 is gated into conduction, to thereby discharge the gate 1g of switch 1 and thereby render switch 1 nonconductive or OFF.

A second subsidiary power supply in FIG. 3 is designated 33, and includes a capacitor 33c having one electrode (the negative or − electrode) coupled to direct voltage source terminal $12_2$, or equivalently to end 20s2b of secondary winding 20s2 of transformer 20. The other electrode of capacitor 33c is connected by way of a rectifier 33r to end 20s2a of secondary winding 20s2. With this configuration, and with a "rectangular" switching signal applied to the transformer, capacitor 33c will charge to a direct voltage substantially equal to the peak value of the rectangular signal. Rectifier 33r has its anode connected to the winding 20s2 and its cathode adjacent capacitor 33c, so the capacitor takes on a positive charge relative to direct voltage source terminal $12_2$ or ground, as suggested by the + symbol. The voltage appearing across capacitor 33c of subsidiary power supply 33 is controllably coupled across the gate-to-source junction of controllable semiconductor switch 3 by a driver switch 43, which is illustrated as a bipolar npn switch transistor having its collector connected to capacitor 33c, its base connected to the end 20s2a of secondary winding 20s2, and its emitter connected to gate electrode 3g of switch 3. In addition, a discharge switch illustrated as a FET 53 has its main current conducting source-to-drain path coupled from the control electrode 3g of switch 3 to direct voltage source 12 terminal $12_2$, and its gate connected to end 20s2a of secondary winding 20s2. During those intervals when end 20s2a of secondary winding 20s1 goes positive relative to the reference terminal $12_2$, the gate 3g is charged by the full voltage then appearing across capacitor 33c. When end 20s2a of secondary winding 20s2 goes negative relative to reference terminal $12_2$, on the other hand, FET 53 is gated into conduction, to thereby discharge the gate 3g of switch 3 and thereby render switch 3 nonconductive or OFF.

In FIG. 3, another subsidiary power supply is designated 32. Subsidiary power supply 32 is connected to secondary winding 22s1 of transformer 22, and includes a capacitor 32c and a rectifier 32r. Rectifier 32r has its cathode connected to end 22s1a of secondary winding 22s1 and its anode to capacitor 32c, and as a result, capacitor 32c charges with the polarity indicated by the plus (+) and minus (−) signs. The positive (+) end of capacitor 32c is connected to tap point 16b. A path for charging the gate 2g of controllable semiconductor switch 2 from secondary winding 22s1 is provided by a unidirectional current conducting device in the form of a rectifier or diode 52, having its anode connected to end 22s1a of secondary winding 22s1 of transformer 22, and its cathode connected to gate 2g. During those intervals in which end 22s1a of winding 22s1 is positive relative to end 22s1b, the sum of the capacitor voltage and the winding voltage is applied to gate 2g, poled to charge the gate 2g to enable conduction of controllable semiconductor switch 2, or to turn it ON. It should be noted that the charge applied to gate 2g to turn ON switch 2 must all flow through the inductance of transformer 22, and is subject to the aforementioned delays. The arrangement of FIG. 3 also includes a drive switch designated generally as 62, which is illustrated as including a bipolar pnp transistor 62t having its collector connected to the negative (−) terminal of capacitor 32c, its emitter connected to gate 2g of controllable semiconductor switch 2, and its base connected by way of a resistor 62r to end 22s1b of secondary winding 22s1, which corresponds to the positive (+) end of capacitor 32c. Taking the positive (+) end of capacitor 32c as being a virtual ground, resistor 62r provides the base current required to turn ON transistor 62t of drive switch 62. A further rectifier or diode 72 has its anode connected to end 22s1a of secondary winding 22s1 of transformer 22, and its cathode connected to the base of transistor 62t. When end 22s1a of transformer secondary winding 22s1 is positive relative to end 22s1b, diode 32r is nonconductive, and diodes 52 and 72 are conductive. With diodes 52 and 72 both conductive, their cathodes are at the same voltage. With the cathodes of diodes 51 and 72 at the same voltage, there is no available base-to-emitter voltage which can turn ON transistor 62t. Consequently, transistor 62t remains OFF during those intervals in which end 22s1a of secondary winding 22s1 is positive relative to end 22s1b. Thus, during those times in which end 22s1a of secondary winding 22s1 of transformer 22 is positively poled, diode 52 turns ON controllable semiconductor switch 2, and diode 72 turns OFF drive switch 62 transistor 62t, so that the capacitor voltage is not applied to the gate 2g of switch 2. When the switching signal reverses, making end 22s1a negative relative to end 22s1b, diode 32r becomes conductive to charge capacitor 32c, and diodes 52 and 72 become nonconductive. With diode 72 nonconductive, transistor 62t is enabled by resistor 62r from the negative (−) plate of capacitor 32c, and discharges the control or gate electrode 2g of controllable semiconductor switch 2. It should be noted that, while the turn-ON of controllable semiconductor switch 2 is by means of charge which must flow through transformer 22, the discharge and turn-OFF of the control electrode 2g of controllable semiconductor switch 2 is by means of a discharge switch 62 which is enabled by small amounts of energy, so it can act quickly to discharge the control electrode 2g to turn switch 2 OFF.

In FIG. 3, a fourth subsidiary power supply is designated 34. Subsidiary power supply 34 is connected to secondary winding 22s2 of transformer 22, and includes a capacitor 34c and a rectifier 34r. Rectifier 34r has its cathode connected to end 22s2a of secondary winding 22s2 and its anode connected to capacitor 34c, and as a result, capacitor 34c charges with the polarity indicated by the plus (+) and minus (−) signs. The positive (+) end of capacitor 34c is connected to terminal 12₂ of direct voltage supply 12. A path for charging the gate 4g of controllable semiconductor switch 4 from secondary winding 22s2 is provided by a unidirectional current conducting device in the form of a rectifier or diode 54, which has its anode connected to end 22s2a of secondary winding 22s2 of transformer 22, and its cathode connected to gate 4g. During those intervals in which end 22s2a of secondary winding 22s2 is positive relative to end 22s2b, the winding voltage is applied to gate 4g, poled to charge the gate 4g to enable conduction of controllable semiconductor switch 4, or to turn it ON. It should be noted that the charge applied to gate 4g to turn ON switch 4 must all flow through the inductance of transformer 22, and is subject to the aforementioned delays, but the delays aren't significant during turn-ON of switch 4. The arrangement of FIG. 3 also includes a drive switch designated generally as 64, which is illustrated as including a bipolar pnp transistor 64t having its collector connected to the negative (−) terminal of capacitor 34c, its emitter connected to gate 4g of controllable semiconductor switch 4, and its base connected by way of a resistor 64r to end 22s2b of secondary winding 22s2, which corresponds to the positive (+) end of capacitor 34c. Taking the positive (+) end of capacitor 32c as being a virtual ground, resistor 64r provides the base current required to turn ON transistor 64t of drive switch 64. A further rectifier or diode 74 has its anode connected to end 22s2a of secondary winding 22s2 of transformer 22, and its cathode connected to the base of transistor 64t. When end 22s2a of transformer secondary winding 22s2 is positive relative to end 22s2b, diode 34r is nonconductive, and diodes 54 and 74 are conductive. With diodes 54 and 74 both conductive, their cathodes are at the same voltage. With the cathodes of diodes 54 and 74 at the same voltage, there is no available base-to-emitter voltage which can turn ON transistor 64t. Consequently, transistor 64t remains OFF during those intervals in which end 22s2a of secondary winding 22s2 is positive relative to end 22s2b. Thus, during those times in which end 22s2a of secondary winding 22s2 of transformer 22 is positively poled, diode 54 turns ON controllable semiconductor switch 4, and diode 74 turns OFF drive switch 64 transistor 64t. When the switching signal reverses, making end 22s2a of secondary winding 22s2 negative relative to end 22s2b, diode 34r becomes conductive to charge capacitor 34c, and diodes 54 and 74 become nonconductive. With diode 74 nonconductive, transistor 64t is enabled by current flow through resistor 64r, and couples the negative (−) voltage from capacitor 34c to discharge the control or gate electrode 4g of controllable semiconductor switch 4. It should be noted that, while the turn-ON of controllable semiconductor switch 4 is by means of charge which must flow through transformer 22, the discharge and turn-OFF is by means of a discharge switch 64, which is enabled by small amounts of energy, so it can act quickly to discharge the control electrode 4g to turn switch 4 OFF.

It will be appreciated that the rapid turn-ON of controllable semiconductor switches 1 and 3, together with the rapid turn-OFF of controllable semiconductor switches 2 and 3, provides optimal enhancement, without the cost inherent in speeding up both the turn-ON and turn-OFF of all four switches.

Thus, a full-wave bridge switching power supply according to a general aspect of the invention includes first (1) and third (3) "serially" connected switches, and second (2) and fourth (4) "serially" connected switches. In this context, the term "serially coupled" relates only to their apparent connections as revealed by the schematic illustrations, as the switching signals prevent the "serial" connection from ever having simultaneous current flow. An output transformer (14) has one end (14p1) of its primary winding connected to the juncture (16a) of the first (1) and third (3) switches and the other (14p2) end connected to the juncture (16b) of the second (2) and fourth (4) switches. The switches are provided, by way of transformers (20, 22), with zero-voltage switching signals. In order to avoid the switch-slowing effects of transformer inductance, a subsidiary power supply (31, 32, 33, 34) is associated with each switch (1, 2, 3, 4, respectively). The subsidiary power supplies (31, 33) of the first (1) and third (3) switches are coupled to the control electrodes (1g, 3g) of the first (1) and third (3) switches at their respective turn-on times, and the subsidiary power supplies (32, 34) of the second (2) and fourth (4) switches are applied to their respective control electrodes (2g, 4g) during their respective turn-off times.

A full-wave switching power supply (10) according to a somewhat more specific hypostasis of the invention includes first (1), second (2), third (3), and fourth (4) controllable switches, each of which includes a control electrode (1g, 2g, 3g, and 4g, respectively) and a controlled current conducting main path (1p, 2p, 3p, and 4p, respectively). A bridge type of connection is provided by means (conductors or wires) connecting a first end (1s) of the main path (1p) of the first controllable switch (1) to a second end (3d) of the main path (3p) of the third controllable switch (3) to thereby define a first tap point (16a), and further means connecting a first end (2s) of the main path (2p) of the second controllable switch (2) to a second end (4d) of the main path (4p) of the fourth controllable switch (4), to thereby define a second tap point (16b). An output transformer (14) includes a primary winding (14p) coupled to the first (16a) and second (16b) tap points, for being driven, during operation, with alternating voltage appearing thereacross. A zero-voltage switching signal generator (18) drives the controllable switches in zero-voltage fashion. A drive transformer arrangement (20, 22) is coupled to the zero-voltage switching signal generator (18) and to the control electrodes (1g, 2g, 3g, and 4g) of the first (1), second (2), third (3), and fourth (4) controllable switches. First (31), second (32), third (33) and fourth (34) subsidiary power supplies are coupled to secondary windings (20s1, 20s2, 22s1, 22s2) of the drive transformer arrangement (20, 22), for generating subsidiary direct voltages in response to the switching signals. First (41), second 42), third (43), and fourth (44) control electrode switches are coupled to the first (31), second (32), third (33), and fourth (34) subsidiary power supplies, respectively, and to the control electrodes of the first (1), second (2), third (3), and fourth (4) controllable switches, respectively, for coupling the first (31) and third (33) subsidiary direct voltages to the control electrodes (1g, 3g) of the first (1) and third (3) controllable switches, respectively, during their respective turn-on intervals (t0–t2; t2–t0), and for coupling the second (32) and fourth (42) subsidiary direct voltages to the control electrodes (2g, 4g) of the second (2) and fourth (4) controllable switches, respectively, during their respective turn-off intervals (t3–t1; t1–t3). It should be understood that the greatest current flow to or from the control electrode will occur immediately following the closing of the control electrode switches.

Thus, a full-wave switching power supply according to an aspect of the invention includes a source (12) of direct voltage. The source (12) of direct voltage defines first (12$_1$) and (12$_2$) second terminals. The power supply also includes a first controllable semiconductor switch (1) including a main current conducting path (1p) and a control electrode (1g), and a third controllable semiconductor switch (3) including a main current conducting path (3p) and a control electrode (3g). The current conducting paths (1p, 3p) of the first (1) and third (3) controllable semiconductor switches are coupled together to define a first tap point (16a). That end (1d) of the main current conducting path (1p) of the first switch (1) which is remote (distant or most distant of the ends, electrically speaking) from the first tap point (16a) is coupled to the first terminal (12$_1$) of the source (12) of direct voltage, and that end (3s) of the current conducting path (3p) of the third controllable switch (3) which is remote from the first tap point (16a) is coupled to the second terminal (12$_2$) of the source (12) of direct voltage. The power supply (10) also includes a second controllable semiconductor switch (2) including a main current conducting path (2p) and a control electrode (2g), and a fourth controllable semiconductor switch (4) including a main current conducting path (4p) and a control electrode (4g). The current conducting paths (2p, 4p) of the second (2) and fourth (4) switches are coupled together to define a second tap point (16b). That end (2d) of the main current conducting path (2p) of the second switch (2) which is remote from the second tap point (16b) is coupled to the first terminal (12$_1$) of the source (12) of direct voltage, and that end (4s) of the current conducting path (4p) of the fourth switch (4) which is remote from the second tap point (16b) is coupled to the second terminal (12$_2$) of the source (12) of direct voltage. The power supply (10) also includes switching control means (18) for generating switching signals (201, 202, 203, 204) for control of the control electrodes (1g, 2g, 3g, 4g) of the first (1), second (2), third (3) and fourth (4) controllable semiconductor switches in such a manner that (a) in a first state (S1) following a fourth state (S4), the first (1) and fourth (4) switches are conductive, and the second (2) and third (3) switches are nonconductive, (b) in a second state (S2) immediately following the first state (S1), the first (1) and second (2) switches are conductive, and the third (3) and fourth (4) switches are nonconductive, (c) in a third state (S3) immediately following the second state (S2), the second (2) and third (3) switches are conductive, and the first (1) and fourth (4) switches are nonconductive, and (d) during the fourth state (S4), immediately preceding the first state (S1), the third (3) and fourth (4) switches are conductive, and the first (1) and second (2) switches are nonconductive. A first transformer arrangement (20) includes a primary winding (20p) coupled to the switching control means (18), and also includes first (20s1) and second (20s2) secondary windings across which a first set (201, 203) of the switching signals are generated. A second transformer arrangement (22) includes a primary winding (22p) coupled to the switching control means (18), and also includes first (22s1) and second (22s2) secondary windings across which a second set (202, 204) of the switching signals are generated. A first subsidiary power supply (31) is coupled to the first secondary winding (20s1) of the first transformer arrangement (20), for producing a first subsidiary direct voltage in response to the switching signals. A third subsidiary power supply (33) is coupled to the second secondary winding (20s2) of the first transformer arrangement (20), for producing a third subsidiary direct voltage in response to the switching signals. A second subsidiary power supply (32) is coupled to the first secondary winding (22s1) of the second transformer arrangement (22), for producing a second subsidiary direct voltage in response to the switching signals. A fourth subsidiary power supply (34) is coupled to the second secondary winding (22s2) of the second transformer arrangement (22), for producing a fourth subsidiary direct voltage in response to the switching signals. A first drive switching means (41, 43) is coupled to the first (31) and second (33) subsidiary power supplies, and to the first (22s1) and second (20s2) secondary windings of the first transformer arrangement (20), and to the control electrodes (1g, 3g) of the first (1) and third (3) controllable semiconductor switches, for coupling the first and third subsidiary direct voltages to the control electrodes (1g, 3g) of the first (1) and third (3) controllable semiconductor switches, respectively, during their respective turn-ON intervals, for charging the control electrodes (1g, 3g) of the first (1) and third (3) controllable semiconductor switches, respectively. A second controllable drive switching means (42, 44) includes control electrodes (bases of 62t and 64t) coupled to the second (32) and third (33) subsidiary power supplies and to the first (22s1) and second (22s2) secondary windings of the second transformer arrangement (22), and also includes switched conduction paths coupled to the control electrodes (2g, 4g) of the second (2) and fourth (4) controllable semiconductor switches and to the second tap point (16b), for, in response to switching signals, coupling the second and fourth subsidiary direct voltages to the control electrodes (bases) of the second controllable drive switching means (42, 44), for thereby discharging the control electrodes (2g, 4g) of the second (2) and fourth (4) controllable semiconductor switches. First control electrode discharge means (51, 53) is or are coupled to the control electrodes (1g, 3g) of the first (1) and third (3) controllable semiconductor switches, and are also coupled to the first (20s1) and second (20s2) secondary windings of the first transformer arrangement (20), for discharging the control electrodes (1g, 3g) of the first (1) and third (3) controllable semiconductor switches during their respective turn-off periods, without applying to the control electrodes (1g, 3g) the subsidiary direct voltages from the first (31) and third (33) subsidiary power supplies. Second control electrode charging means (52, 54) is or are coupled to the control electrodes (2g, 4g) of the second (2) and fourth (4) controllable semiconductor switches, and also coupled to the first (22s1) and second (22s2) secondary windings of the second transformer arrangement (22), for charging the control electrodes (2g, 4g) of the second (2) and fourth (4) controllable semiconductor switches during their respective turn-ON intervals, without applying to the control electrodes (2g, 4g) the subsidiary direct voltages from the second (32) and fourth (34) subsidiary power supplies.

A switching power supply (10) according to another aspect of the invention is for producing alternating voltage from a source (12) of direct voltage, where the source (12) of direct voltage includes first ($12_1$) and second ($12_2$) power terminals. The power supply (10) comprises a power transformer (14) which includes a primary winding (14p) defining first (14p) and second (14p2) ends, and also defining a secondary winding (14s) at which the alternating voltage is produced. The switching power supply (10) also includes first (1), second (2), third (3), and fourth (4) power switches, each includes a main current conducting (S-to-D) path (1p, 2p, 3p, and 4p, respectively) and a control electrode (1g, 2g, 3g, 4g). The first (1) and third (3) power switches have their main current conducting (S-to-D) paths (1p, 3p) coupled together to define a first tap point (16a). The first tap point (16a) is coupled to the first terminal (14p1) of the primary winding (14p) of the power transformer (14). The second (2) and fourth (4) power switches have their main current conducting (S-to-D) paths (2p, 4p) coupled together to define a second tap point (16b). The second tap, point (16b) is coupled to the second terminal (14p2) of the primary winding (14p) of the power transformer (14). That end (1d) of the main current conducting (S-to-D) path of the first power switch (1) which is remote (more distant, electrically speaking) from the first tap point (16a) is coupled to the first power terminal ($12_1$) of the source (12) of direct voltage. That end of the main current conducting (S-to-D) path (3p) of the third power switch (3) which is remote from the first tap point (16a) is coupled to the second power terminal ($12_2$) of the source (12) of direct voltage. That end of the main current conducting (S-to-D) path (2p) of the second power switch (2) which is remote from the second tap point (16b) is coupled to the first power terminal ($12_1$) of the source (12) of direct voltage. That end of the main current conducting (S-to-D) path (4p) of the fourth power switch (4) which is remote from the second tap point (16b) is coupled to the second power terminal ($12_2$) of the source (12) of direct voltage. Taken together, these connections define a full-wave bridge structure. The switching power supply (10) according to this other aspect of the invention also includes a source (18) of zero-voltage switching signals (201, 202, 203, 204) for controlling a full-wave bridge for zero-voltage switching. A first transformer arrangement (20) includes a primary winding (20p) coupled to the source (18) of switching signals, and also includes first (20s1), and second (20s2) secondary windings, for coupling switching signals to the control electrodes (1g, 2g) of the first (1) and third (3) power switches. A first subsidiary power supply (31) is coupled to the first secondary winding (20s1) of the first transformer arrangement (20), for producing a first subsidiary direct voltage, relative to the first tap (16a), in response to the switching signals. A third subsidiary power supply (33) is coupled to the second secondary winding (20s2) of the first transformer arrangement (20), for producing a third subsidiary direct voltage, relative to the second terminal ($12_2$) of the source (12) of direct voltage (12), also in response to the switching signals. A first control electrode (1g) or gate turn-on control switch arrangement (41) is coupled to the first subsidiary power supply (31) and to the control electrode (1g) of the first power switch (1), for applying the first subsidiary direct voltage to the control electrode (1g) of the first power switch (1) in response to a turn-on portion of the zero-voltage switching signals applied to the first transformer arrangement (20). A first control electrode (1g) turn-off control switch arrangement (51) is coupled to the control electrode (1g) of the first power switch (1) and to the first tap point (16a), for discharging the control electrode (1g) of the first power switch (1) in response to a turn-off portion of the switching signals applied to the first transformer arrangement (20). A third control electrode (3g) turn-on control switch arrangement (43) is coupled to the third subsidiary power supply (33) and to the control electrode (3g) of the third power switch (3), for applying the third subsidiary direct voltage to the control electrode (3g) of the third power switch (3) in response to a turn-on portion of the switching signals applied to the first transformer arrangement (20). A third control electrode (3g) or gate turn-off control switch arrangement (53) is coupled to the control electrode (3g) of the third power switch (3) and to the second terminal ($12_2$) of the source (12) of direct voltage, for discharging the control electrode (3g) of the third power switch (3) in response to a turn-off portion of the switching signals applied to the first transformer arrangement (20).

The switching power supply (10) according to this other aspect of the invention also comprises a second transformer arrangement (22) including a primary winding (22p) coupled to the source (18) of switching signals, and also includes first (22s1) and second (22s2) secondary windings, for receiving switching signals (203, 204) for coupling to the control electrodes (2g, 4g) of the second (2) and fourth (4) power switches. A second subsidiary power supply (32) is coupled to the first secondary winding (22s1) of the second transformer arrangement (22), for producing, in response to the switching signals, a second subsidiary direct voltage, relative to the second tap (16b). A fourth subsidiary power supply (34) is coupled to the second secondary winding (22S2) of the second transformer arrangement (22), for producing a fourth subsidiary direct voltage, relative to the second terminal ($12_2$) of the source (12) of direct voltage, also in response to the switching signals. A second control electrode (2g) or gate turn-on control switch arrangement (42) is coupled to the first terminal (22s1a) of the first secondary winding (22s1) of the second transformer arrangement (22), for supplying charge to the second control electrode (2g) of the second switching arrangement (2) during a turn-on portion of the switching signals. A second control electrode (2g) turn-off control switch arrangement (52) is coupled to the second subsidiary power supply (32) and to the control electrode (2g) of the second power switch (2), for applying the second subsidiary direct voltage to the control electrode (2g) of the second power switch (2) in response to a turn-off portion of the switching signals applied to the second transformer arrangement (22). A fourth control electrode gate (4g) or gate turn-on control switch arrangement (44) is coupled to the first terminal (22s2a) of the second secondary winding (22s2) of the second transformer arrangement (22), for supplying charge to the control electrode (4g) of the fourth switching arrangement (4) during a turn-on portion of the switching signals applied to the second transformer arrangement (22). A fourth control electrode (4g) turn-off control switch arrangement (54) is coupled to the fourth subsidiary power supply (34) and to the control electrode (4g) of the fourth power switch (4), for applying the fourth subsidiary direct voltage to the control electrode (4g) of the fourth power switch (4) in response to a turn-off portion of the switching signals applied to the second transformer arrangement (22).

In a particular embodiment of this other aspect of the invention, the switching power supply further includes a second end (20s1b) of the first secondary winding (20s1) of the first transformer arrangement (20) electrically connected to the first tap point (16a), and the first subsidiary power supply (31) includes a first rectifier (31r) and a first capacitor (31c) coupled to the first secondary winding (2oS1) of the first transformer arrangement (20), for producing the first subsidiary direct voltage across the first capacitor (31c) in response to the switching signals. The third subsidiary power supply (33) of this particular embodiment also further includes a third rectifier (33r) and a third capacitor (33c) coupled to the second secondary winding (20s2) of the first transformer arrangement (20), for producing a third subsidiary direct voltage across the third capacitor (33c) in response to the switching signals. The first control electrode turn-on control switch arrangement (41) is coupled to a terminal of the first capacitor (31c) and to the control electrode (1g) of the first power switch (1), and the third control electrode turn-on control switch arrangement (43) is coupled to a terminal of the third capacitor, and to the control electrode (3g) of the third power switch (3).

In a particular avatar of the particular embodiment, the first capacitor (31c) includes one electrode (−) connected to the second terminal (20s1b) of the first secondary winding (20s1) of the first transformer arrangement (20) and to the first tap point (16a), and a second electrode (+) connected to a terminal (cathode) of the first rectifier (31r), the second capacitor (32c) includes one electrode (+) coupled to the second terminal (22s1b) of the first secondary winding (22s1) of the second transformer arrangement (22), the third capacitor (33c) includes one electrode (−) coupled to a second terminal (20s2b) of the second secondary winding (20s2) of the first transformer arrangement (20), and the fourth capacitor (34c) includes one electrode (+) coupled to the second terminal (22s2b) of the second secondary terminal (22s2) of the second transformer arrangement (22).

In a particular hypostasis of this avatar of the power supply (10), the first control electrode (1g) turn-on control switch arrangement (41) includes a control electrode (base), which control electrode (base) is coupled to the first terminal (20s1a) of the first secondary winding (20s1) of the first transformer arrangement (20), the third control electrode (3g) turn-on control switch arrangement (43) includes a control electrode (base), which control electrode is coupled to the second terminal of the source (12) of direct voltage, the second control electrode (2g) turn-off control switch arrangement (42) includes a control electrode (base of 62t), which control electrode is coupled (by way of diode 72) to the first terminal (22s1a) of the first secondary winding (22s1) of the second transformer arrangement (22), and the fourth control electrode (4g) turn-off control switch arrangement (44) includes a control electrode (base of 64t) which control electrode (base) is coupled (by way of diode 74) to the first terminal (22s2a) of the second secondary winding (22s2) of the second transformer arrangement (22).

What is claimed is:

1. A full-wave switching power supply, comprising:

first, second, third, and fourth controllable switches, each including a control electrode and a controlled current conducting main path;

means connecting a first end of said main path of said first controllable switch to a second end of said main path of said third controllable switch to thereby define a first tap point;

means connecting a first end of said main path of said second controllable switch to a second end of said main path of said fourth controllable switch, to thereby define a second tap point;

an output transformer including a primary winding coupled to said first and second tap points, for being driven, during operation, with alternating voltage appearing thereacross;

zero-voltage switching signal generating means;

transformer means coupled to said zero-voltage switching signal generating means and to said control electrodes of said first, second, third, and fourth controllable switches;

first, second, third and fourth subsidiary power supplies coupled to secondary windings of said transformer means, for generating subsidiary direct voltages in response to said switching signals; and first, second, third, and fourth control electrode switches coupled to said first, second, third, and fourth subsidiary power supplies, respectively, and to said control electrodes of said first, second, third, and fourth controllable switches, respectively, for coupling said first and third subsidiary direct voltages to said control electrodes of said first and third controllable switches, respectively, during their respective turn-on intervals, and for coupling said second and fourth subsidiary direct voltages to said control electrodes of said second and fourth controllable switches, respectively, during their respective turn-off intervals.

2. A full-wave switching power supply, comprising:

a source of direct voltage defining first and second terminals;

a first controllable semiconductor switch including a main current conducting path and a control electrode;

a third controllable semiconductor switch including a main current conducting path and a control electrode, said current conducting paths of said first and third controllable semiconductor switches being coupled together to define a first tap point, that end of said main current conducting path of said first switch which is remote from said first tap point being coupled to said first terminal of said source of direct voltage, and that end of said current conducting path of said third controllable switch which is remote from said first tap point being coupled to said second terminal of said source of direct voltage;

a second controllable semiconductor switch including a main current conducting path and a control electrode;

a fourth controllable semiconductor switch including a main current conducting path and a control electrode, said current conducting paths of said second and fourth switches being coupled together to define a second tap point, that end of said main current conducting path of said second switch which is remote from said second tap point being coupled to said first terminal of said source of direct voltage, and that end of said current conducting path of said fourth switch which is remote from said second tap point being coupled to said second terminal of said source of direct voltage;

switching control means for generating switching signals for control of said control electrodes of said first, second, third and fourth controllable semiconductor switches in such a manner that (a) in a first state following a fourth state, said first and fourth switches are conductive, and said second and third switches are nonconductive, (b) in a second state immediately following said first state, said first and second switches are conductive, and said third and fourth switches are nonconductive, (c) in a third state immediately following said second state, said second and third switches are conductive, and said first and fourth switches are nonconductive, and (d) during said fourth state, immediately preceding said first state, said third and fourth switches are conductive, and said first and second switches are nonconductive;

a first transformer arrangement including a primary winding coupled to said switching control means, and also including first and second secondary windings across which a first set of said switching signals are generated;

a second transformer arrangement including a primary winding coupled to said switching control means, and also including first and second secondary windings across which a second set of said switching signals are generated;

a first subsidiary power supply coupled to said first secondary winding of said first transformer arrangement, for producing a first subsidiary direct voltage in response to said switching signals;

a third subsidiary power supply coupled to said second secondary winding of said first transformer arrangement, for producing a third subsidiary direct voltage in response to said switching signals;

a second subsidiary power supply coupled to said first secondary winding of said second transformer arrangement, for producing a second subsidiary direct voltage in response to said switching signals;

a fourth subsidiary power supply coupled to said second secondary winding of said second transformer arrangement, for producing a fourth subsidiary direct voltage in response to said switching signals;

first drive switching means coupled to said first and second subsidiary power supplies, and to said first and second secondary windings of said first transformer arrangement, and to said control electrodes of said first and third controllable semiconductor switches, for coupling said first and third subsidiary direct voltages to said control electrodes of said first and third controllable semiconductor switches, respectively, during their respective turn-ON intervals, for charging said control electrodes of said first and third controllable semiconductor switches, respectively, for enabling said first and third switches;

second controllable drive switching means including control electrodes coupled to said second and third subsidiary power supplies and to said first and second secondary windings of said second transformer arrangement, and also including switched conduction paths coupled to said control electrodes of said second and fourth controllable semiconductor switches and to said second tap point, for, in response to switching signals, coupling said second and fourth subsidiary direct voltages to said control electrodes of said second controllable drive switching means, for thereby discharging said control electrodes of said second and fourth controllable semiconductor switches for thereby disabling said second and fourth controllable semiconductor switches;

first control electrode discharge means coupled to said control electrodes of said first and third controllable semiconductor switches, and also coupled to said first and second secondary windings of said first transformer arrangement, for discharging said control electrodes of said first and third controllable semiconductor switches during their respective turn-off periods, without applying to said control electrodes said subsidiary direct voltages from said first and third subsidiary power supplies; and second control electrode charging means coupled to said control electrodes of said second and fourth controllable semiconductor switches, and also coupled to said first and second secondary windings of said second transformer arrangement, for charging said control electrodes of said second and fourth controllable semiconductor switches during their respective turn-ON intervals, without applying to said control electrodes said subsidiary direct voltages from said second and fourth subsidiary power supplies.

3. A switching power supply for producing alternating voltage from a source of direct voltage, where the source of direct voltage includes first and second power terminals, said power supply comprising:

a power transformer including a primary winding defining first and second ends, and also defining a secondary winding at which said alternating voltage is produced;

first, second, third, and fourth power switches, each including a main current conducting path and a control electrode, said first and third power switches having said main current conducting paths coupled together to define a first tap point, said first tap point being coupled to said first terminal of said primary winding of said power is transformer, said second and fourth power switches having said main current conducting paths coupled together to define a second tap point, said second tap point being coupled to said second terminal of said primary winding of said power transformer, that end of said main current conducting path of said first power switch which is remote from said first tap point being coupled to said first power terminal of said source of direct voltage, that end of said main current conducting path of said third power switch which is remote from said first tap point being coupled to said second power terminal of said source of direct voltage, that end of said main current conducting path of said second power switch which is remote from said second tap point being coupled to said first power terminal of said source of direct voltage, that end of said main current conducting path of said fourth power switch which is remote from said second tap point being coupled to said second power terminal of said source of direct voltage, for thereby defining a full-wave bridge structure;

a source of zero-voltage switching signals for controlling a full-wave bridge for zero-voltage switching;

first transformer means including a primary winding coupled to said source of switching signals, and also including first and second secondary windings, for coupling switching signals to said control electrodes of said first and third power switches;

a first subsidiary power supply coupled to said first secondary winding of said first transformer means, for producing a first subsidiary direct voltage, relative to said first tap, in response to said switching signals;

a third subsidiary power supply coupled to said second secondary winding of said first transformer means, for producing a third subsidiary direct voltage, relative to said second terminal of said source of direct voltage, in response to said switching signals;

first control electrode turn-on control switch means coupled to said first subsidiary power supply and to said control electrode of said first power switch, for applying said first subsidiary direct voltage to said control electrode of said first power switch in response to a turn-on portion of said switching signals applied to said first transformer means;

first control electrode turn-off control switch means coupled to said control electrode of said first power switch and to said first tap point, for discharging said control electrode of said first power switch in response to a turn-off portion of said switching signals applied to said first transformer means without application of said first subsidiary direct voltage;

third control electrode turn-on control switch means coupled to said third subsidiary power supply and to said control electrode of said third power switch, for applying said third subsidiary direct voltage to said control electrode of said third power switch in response to a turn-on portion of said switching signals applied to said first transformer means;

third control electrode turn-off control switch means coupled to said control electrode of said third power switch and to said second terminal of said source of direct voltage for discharging said control electrode of said third power switch in response to a turn-off portion of said switching signals applied to said first transformer means without application of said third subsidiary voltage;

second transformer means including a primary winding coupled to said source of switching signals, and also including first and second secondary windings, for receiving switching signals for coupling to said control electrodes of said second and fourth power switches;

a second subsidiary power supply coupled to said first secondary winding of said second transformer means, for producing a second subsidiary direct voltage, relative to said second tap in response to said switching signals;

a fourth subsidiary power supply coupled to said second secondary winding of said second transformer means, for producing a fourth subsidiary direct voltage, relative to said second terminal of said source of direct voltage, in response to said switching signals;

second control electrode turn-on control switch means coupled to said first terminal of said first secondary winding of said second transformer means, for supplying charge to said second control electrode of said second switching means during a turn-on portion of said switching signals without application of said second subsidiary direct voltage;

second control electrode turn-off control switch means coupled to said second subsidiary power supply and to said control electrode of said second power switch, for applying said second subsidiary direct voltage to said control electrode of said second power switch in response to a turn-off portion of said switching signals applied to said second transformer means;

fourth control electrode turn-on control switch means coupled to said first terminal of said second secondary winding of said second transformer means, for supplying charge to said control electrode of said fourth switching means during a turn-on portion of said switching signals applied to said second transformer means without application of said fourth subsidiary direct voltage; and fourth control electrode turn-off control switch means coupled to said fourth subsidiary power supply and to said control electrode of said fourth power switch, for applying said fourth subsidiary direct voltage to said control electrode of said fourth power switch in response to a turn-off portion of said switching signals applied to said second transformer means.

4. A switching power supply according to claim 3, wherein:

a second end of said first secondary winding of said first transformer means is electrically connected to said first tap point;

said first subsidiary power supply includes a first rectifier and a first capacitor coupled to said first secondary winding of said first transformer means, for producing said first subsidiary direct voltage across said first capacitor in response to said switching signals;

said third subsidiary power supply includes a third rectifier and a third capacitor coupled to said second secondary winding of said first transformer means, for producing a third subsidiary direct voltage across said third capacitor in response to said switching signals;

said first control electrode turn-on control switch means is coupled to a terminal of said first capacitor and to said control electrode of said first power switch; and said third control electrode turn-on control switch means is coupled to a terminal of said third capacitor, and to said control electrode of said third power switch.

5. A power supply according to claim 4, wherein:

said first capacitor includes one electrode connected to said second terminal of said first secondary winding of said first transformer means and to said first tap point, and a second electrode connected to a terminal of said first rectifier;

said second capacitor includes one electrode coupled to said second terminal of said first secondary winding of said second transformer means and to said second tap point, and a second electrode connected to a terminal of said second rectifier;

said third capacitor includes one electrode coupled to a second terminal of said second secondary winding of said first transformer means and to said second power terminal of said source of direct voltage, and a second electrode coupled to a third rectifier; and said fourth capacitor includes one electrode coupled to said second terminal of said second secondary terminal of said second transformer means and to said second power terminal of said source of direct voltage, and a second electrode coupled to said fourth rectifier.

6. A power supply according to claim 4, wherein:

said first control electrode turn-on control switch means includes a control electrode, said control electrode being coupled to said first terminal of said first secondary winding of said first transformer means;

said third control electrode turn-on control switch means includes a control electrode, said control electrode being coupled to said second terminal of said source of direct voltage;

said second control electrode turn-off control switch means includes a control electrode, said control electrode being coupled to said first terminal of said first secondary winding of said second transformer means; and said fourth control electrode turn-off control switch means includes a control electrode, said control electrode being coupled to said first terminal of said second secondary winding of said second transformer means.

* * * * *